US012646713B2

(12) United States Patent
Chang et al.

(10) Patent No.: US 12,646,713 B2
(45) Date of Patent: Jun. 2, 2026

(54) POSITIVE ACTIVE MATERIAL FOR LITHIUM SECONDARY BATTERY COMPRISING A PARTICLE SIZE DISTRIBUTION

(71) Applicant: L&F CO., LTD., Daegu (KR)

(72) Inventors: Sung Kyun Chang, Daegu (KR); Jeong A Gu, Daegu (KR); Hyun Gyu Han, Daegu (KR); Han Ah Kim, Geoje-si (KR)

(73) Assignee: L&F CO., LTD., Daegu (KR)

( * ) Notice: Subject to any disclaimer, the term of this patent is extended or adjusted under 35 U.S.C. 154(b) by 858 days.

(21) Appl. No.: 17/640,461

(22) PCT Filed: Sep. 25, 2019

(86) PCT No.: PCT/KR2019/012429
§ 371 (c)(1),
(2) Date: Apr. 25, 2022

(87) PCT Pub. No.: WO2021/060576
PCT Pub. Date: Apr. 1, 2021

(65) Prior Publication Data

US 2022/0344653 A1     Oct. 27, 2022

(51) Int. Cl.
H01M 4/525        (2010.01)
H01M 4/02         (2006.01)
(Continued)

(52) U.S. Cl.
CPC ...... H01M 4/525 (2013.01); H01M 2004/021 (2013.01); H01M 2004/028 (2013.01);
(Continued)

(58) Field of Classification Search
CPC ...... H01M 4/131; H01M 4/505; H01M 4/525; H01M 10/0525; H01M 2004/021; H01M 2004/028
See application file for complete search history.

(56)                References Cited

U.S. PATENT DOCUMENTS

| | | | | |
|---|---|---|---|---|
| 2015/0243984 | A1* | 8/2015 | Kase ...................... | C01G 53/66 429/223 |
| 2019/0319257 | A1* | 10/2019 | Ogawa .................. | H01M 4/525 |
| 2020/0287212 | A1* | 9/2020 | Kobayashi ............. | C01G 53/40 |

FOREIGN PATENT DOCUMENTS

| | | |
|---|---|---|
| JP | 2003137554 | 5/2003 |
| KR | 20050093535 A  * | 9/2005 |

(Continued)

OTHER PUBLICATIONS

EPO machine generated English translation of KR 101883406 B1 (Year: 2018).*

(Continued)

*Primary Examiner* — Kimberly Wyluda
(74) *Attorney, Agent, or Firm* — LEX IP MEISTER, PLLC

(57)                ABSTRACT

Disclosed is a cathode active material for lithium secondary batteries containing lithium transition metal composite oxide in the form of primary particles having a one-body structure, the cathode active material having a ratio (R/L) of a right area (R) to a left area (L) in a particle size distribution (PSD) graph of less than 1.1, based on a maximum point of a main peak in the particle size distribution (PSD) graph, in which an X-axis represents a particle size (μm) and a Y-axis represents a relative particle amount (%).

4 Claims, 2 Drawing Sheets

(51) Int. Cl.
H01M 4/131 (2010.01)
H01M 4/505 (2010.01)
H01M 10/0525 (2010.01)

(52) U.S. Cl.
CPC ............ *H01M 4/131* (2013.01); *H01M 4/505* (2013.01); *H01M 10/0525* (2013.01)

(56) References Cited

FOREIGN PATENT DOCUMENTS

| | | |
|---|---|---|
| KR | 20140067509 | 6/2014 |
| KR | 101882878 | 7/2018 |
| KR | 101883406 B1 * | 7/2018 |
| KR | 20190044327 | 4/2019 |
| KR | 20190059241 | 5/2019 |
| KR | 20190093547 | 8/2019 |

OTHER PUBLICATIONS

EPO machine generated English translation of KR 20050093535 A (Year: 2005).*

* cited by examiner

【FIG. 1】
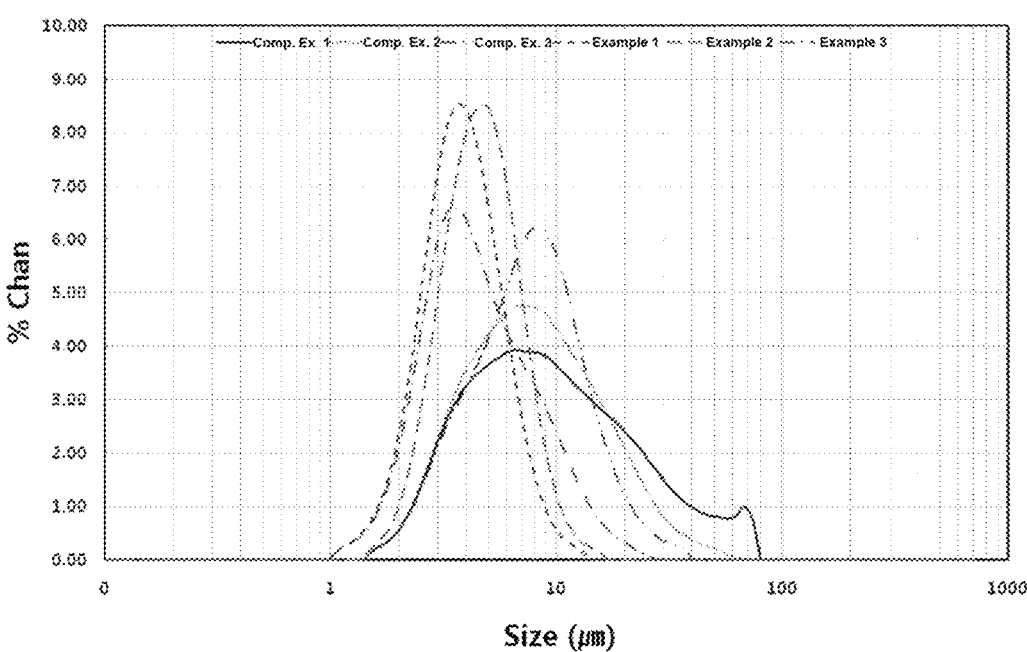
【FIG. 2】
(a)              (b)              (c)
(d)              (e)              (f)
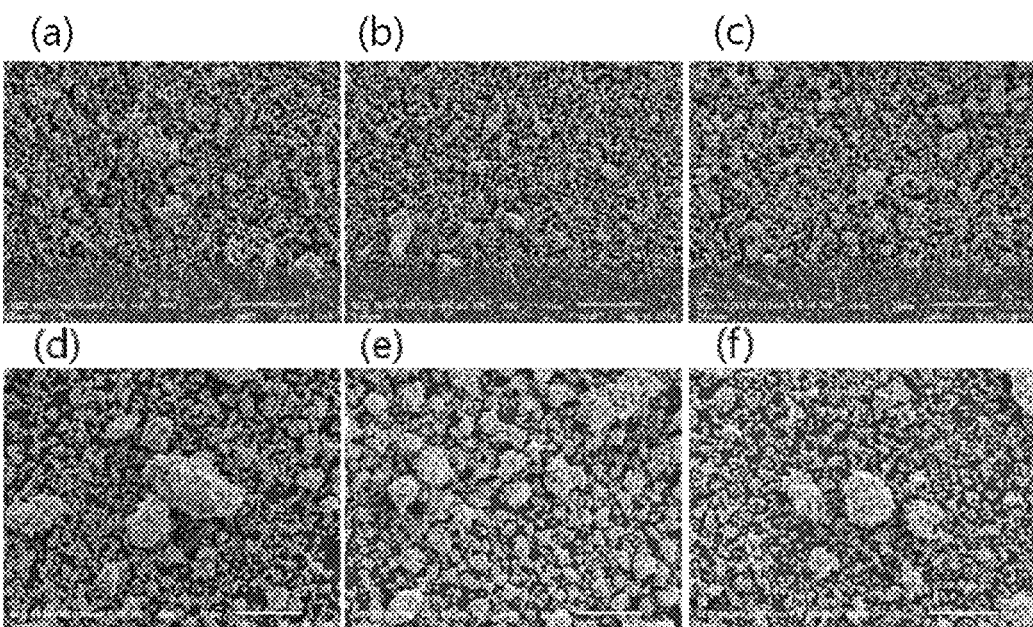

【FIG. 3】
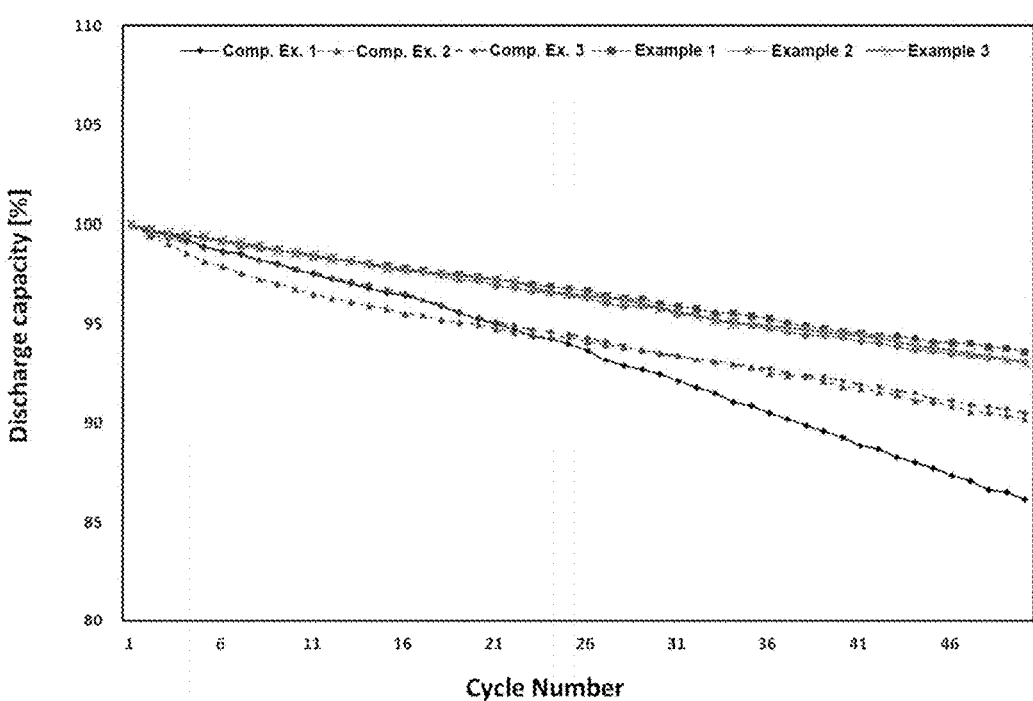
【FIG. 4】
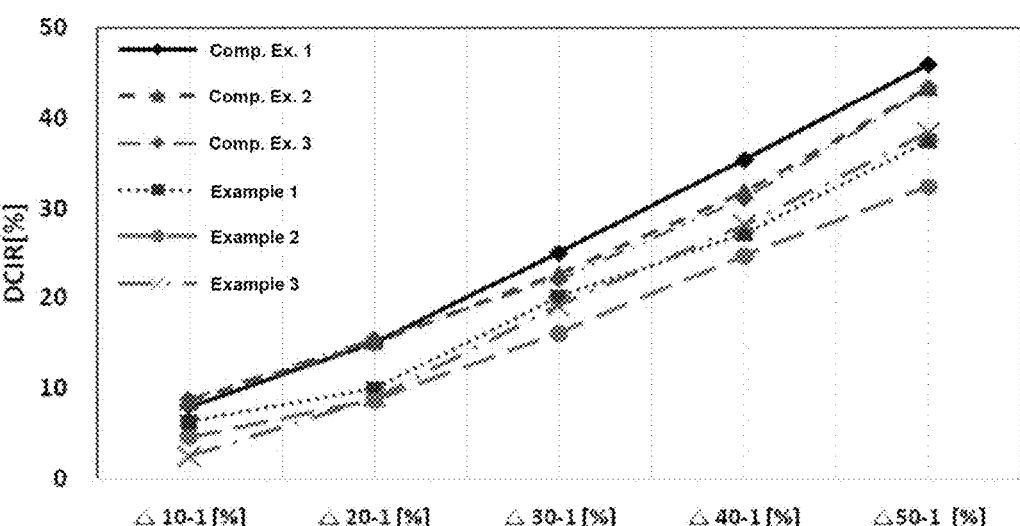

POSITIVE ACTIVE MATERIAL FOR LITHIUM SECONDARY BATTERY COMPRISING A PARTICLE SIZE DISTRIBUTION

TECHNICAL FIELD

The present invention relates to a cathode active material for lithium secondary batteries and more particularly to a cathode active material that is capable of imparting excellent resistance reduction and lifespan characteristics to lithium secondary batteries based on a particle size distribution satisfying specific conditions.

BACKGROUND ART

Lithium secondary batteries are mainly used for digital devices such as laptops and mobile phones, and the range of application of lithium secondary batteries is expected to expand tremendously from portable information and communication devices to electric vehicles, hybrid automobiles, space and aviation, energy storage systems (ESS), and the like based on cost reduction and performance stabilization through mass production, technological development and performance stabilization [Lithium secondary battery material technology trends, S&T Market Report, The Commercialization Promotion Agency for R&D Outcomes (COMPA), September 2018].

The core materials of lithium secondary batteries are a cathode material, an anode material, an electrolyte, and a separator. Among them, the cathode material is the most essential material for producing secondary batteries, and includes lithium cobalt oxide (LCO), lithium nickel cobalt manganese oxide (NCM), lithium nickel cobalt aluminum oxide (NCA), lithium manganese oxide (LMO), lithium iron phosphate (LFP) and the like.

Conventional cathode active materials are mainly used in the form of secondary particles in which primary particles are aggregated, but secondary-particle-type cathode active materials have a high specific surface area and thus a wide direct contact area with the electrolyte, which may cause side reactions with the electrolyte.

In addition, secondary particles present in the cathode active material increase the internal impedance of the battery and thus deteriorate the initial discharge capacity and are destroyed by stress generated at the grain boundary due to expansion and contraction of the crystal lattice during charging and discharging, which may cause deterioration in the capacity of lithium secondary batteries.

Meanwhile, in an attempt to suppress side reactions between the surface of the active material and the electrolyte, a coating layer may be formed on the surface of the active material. This coating layer prevents direct contact between the electrolyte and the active material surface, thereby ultimately providing effects of suppressing side reactions and improving the lifespan characteristics of the battery.

However, aggregation between a plurality of active materials may occur during the calcination process, and coating treatment may miss surfaces that are in contact with each other due to aggregation. The uncoated area of the surfaces, where the coating is not performed, is exposed during charging and discharging, thus causing a problem of deteriorated performance of the battery.

Accordingly, there is an increasing need for solutions to these problems.

DISCLOSURE

Technical Problem

Therefore, the present invention has been made to solve the above and other technical problems that have yet to be solved.

Therefore, as a result of extensive research and various experimentation, the present inventors developed a cathode active material for a lithium secondary battery having a specific particle size distribution and found that this cathode active material contains primary particles having a one-body structure and has a reduced degree of aggregation between primary particles, thereby improving battery characteristics such as resistance reduction and enabling easy additional surface treatment. The present invention was completed based thereon.

Technical Solution

In accordance with an aspect of the present invention, provided is a cathode active material for lithium secondary batteries containing lithium transition metal composite oxide in the form of primary particles having a one-body structure, the cathode active material having a ratio (R/L) of a right area (R) to a left area (L) in a particle size distribution (PSD) graph of less than 1.1, based on a maximum point of a main peak in the particle size distribution (PSD) graph, in which an X-axis represents a particle size (μm) and a Y-axis represents a relative particle amount (%).

Here, with respect to the maximum point (maximum height) of the main peak, the particle size X of the right area is larger than the particle size X of the left area. Therefore, in the cathode active material for a lithium secondary battery according to the present invention, particles having a small particle size have a higher relative particle amount (R/L<1) or a similar relative particle amount within a certain range (1≤R/L<1.1) compared to particles having a large particle size, based on the particle size having the highest relative particle amount. Specifically, the PSD of the active material is measured in order to determine the particle size distribution. As the area in the particle size distribution graph derived from the PSD is biased toward the right, the aggregation ratio between the primary particles increases and thus the amount of active material having a larger particle size increases. On the other hand, as the area in the particle size distribution graph derived from the PSD is biased toward the left, the aggregation ratio between the primary particles decreases and thus the amount of active material having a smaller particle size increases.

Therefore, the cathode active material for a lithium secondary battery according to the present invention has a limited bias to the right area in the graph of PSD (particle size distribution), which means that the degree of aggregation between primary particles is low, so a required amount of particles having a smaller particle size is secured, and the relative amount of particles having a larger size is limited.

A cathode active material having a particle size distribution has a low degree of aggregation between primary particles and thus has reduced resistance compared to an active material having a high degree of aggregation between primary particles, thereby improving battery characteristics such as capacity increase and reducing the possibility of occurrence of an uncoated area in the aggregate during formation of the coating layer. In addition, the primary particles that may be contained in the active material are less likely to cause particle destruction, i.e., cracks, during repeated charging and discharging, thus contributing to the improvement of the performance of lithium secondary batteries.

The particle size distribution graph may be obtained, for example, under the following PSD measurement conditions.

<Measurement Conditions>

Measuring equipment: Microtrac S3500 Extended

Cycle rate: 45%/sec

Refraction index ratio: 1.55

Solvent fed to equipment: distilled water

Sample of cell: 0665

Calculation Logic: X100

Sample amount: 0.0025 g

Dispersant fed to sample: 1 ml of 10% sodium hexam-
etaphosphate

Solvent fed to sample: 40 ml of distilled water

Sample ultrasonic dispersion: 40 kHz, 1 min

The cathode active material for a lithium secondary battery according to the present invention may be imparted with a structure characterized by reduced aggregation between primary particles through control of process conditions such as calcination temperature during the production process, or with a structure characterized by reduced aggregation through separate post-treatment after calcination during the manufacturing process. Here, the separate post-treatment after calcination may be a process of applying an appropriate pressure, shear force, or the like to the calcined active material, but is not limited thereto.

The degree of aggregation between primary particles can also be detected by scanning electron microscopy, etc., which can be seen from results of scanning electron microscopy performed on Examples which will be described later.

In one specific embodiment, the cathode active material of the present invention may have a ratio (FWHM/maximum height) of the full width at half maximum (FWHM) to the maximum height of the main peak in a particle size distribution (PSD) graph of 1.0 or less.

The uniform particle size distribution of the active material is a factor that can affect the performance of lithium secondary batteries, such as the lifespan and efficiency thereof. The narrower the width of the main peak of the PSD graph, the more uniform the particle size distribution of the active material, which can be determined by measuring the full width at half maximum (FWHM) of the main peak.

Accordingly, it can be determined that the cathode active material of the present invention has a value obtained by dividing the full width at half maximum (FWHM) of the main peak by the maximum height thereof in the PSD graph, which satisfies the above-described range, thus exhibiting a more uniform particle size distribution.

The lower limit of the FWHM/maximum height is not particularly limited, and may be, for example, 0.3 or more.

The uniformity of the particle size distribution can be determined by detecting the particle size distribution represented by (D90-D10)/D50, in addition to measurement of the FWHM of the maximum peak in the particle size distribution graph. As the value of (D90-D10)/D50 decreases, the particle size uniformity increases.

Accordingly, in another specific embodiment, the cathode active material of the present invention may have a particle size distribution represented by (D90-D10)/D50, of 1.2 or less.

Accordingly, in another specific embodiment, the cathode active material of the present invention may have a particle size distribution represented by (D90-D10)/D50, of 1.2 or less.

The lower limit of (D90-D10)/D50 is not particularly limited, and may be, for example, 0.8 or more.

As described above, according to some embodiments of the present invention, it is possible to provide a cathode active material for a lithium secondary battery having a low degree of aggregation between primary particles and excellent particle size distribution uniformity.

In this case, in order to provide a cathode active material having excellent particle size distribution uniformity, the ratio of particles having a smaller particle size and particles having a larger particle size may be adjusted. When the difference between the right area (R) and the left area (L) in the graph is excessively large based on the maximum point of the main peak in the PSD graph, the particle size distribution graph may be broad, which means that the cathode active material does not have a uniform particle size distribution.

Therefore, in the cathode active material for a lithium secondary battery according to an embodiment of the present invention, the ratio (R/L) of the right area (R) to the left area (L) in the graph based on the maximum point of the main peak in the particle size distribution (PSD) graph may be preferably not less than 0.8 and less than 1.1, more preferably not less than 0.8 and not more than 1.0, and the PSD graph of the cathode active material may be relatively sharp, which means that the particle size distribution is uniform.

The cathode active material for a lithium secondary battery according to the present invention may include primary particles having a one-body structure of a lithium transition metal composite oxide containing at least one of Ni, Co, and Mn, and the average particle diameter of the primary particles may be 3 to 10 μm.

In one specific embodiment, the lithium transition metal composite oxide may have a composition represented by the following Formula 1.

$$Li_a[M_{1-b}X_b]O_{c-d}Q_d \qquad (1)$$

wherein

M is $Ni_xCo_yMn_z$,

X includes at least one selected from alkali metals excluding lithium, alkaline earth metals, transition metals of Groups 3 to 12 excluding nickel, cobalt, and manganese, post-transition metals and metalloids from Groups 13 to 15, and non-metal elements from Groups 14 to 16, Q includes at least one of F, P and S, a, b, c, and d satisfy $0.8 \leq a \leq 1.2$, $0 \leq b \leq 0.3$, $1.8 < c < 2.2$, and $0 \leq d > 0.2$, and x, y, and z satisfy $0 < x < 1$, $0 < y < 1$, and $0 < z < 1$ with the proviso that $0 < x+y+z \leq 1$.

Specifically, X may be an alkali metal excluding lithium such as Na, K, Rb, Cs, or Fr, an alkaline earth metal such as Be, Mg, Ca, Sr, Ba, or Ra, a transition metal of Groups 3 to 12, excluding nickel, cobalt, and manganese, such as Sc, Ti, V, Cr, Fe, Cu, Zn, Y, Zr, Nb, Mo, Tc, Ru, Rh, Pd, Ag, Cd, Hf, Ta, W, Re, Os, Ir, Pt, Au, or Hg, a post-transition metal or metalloid of Groups 13 to 15 such as Al, Ga, In, Sn, Tl, Pb, Bi, Po, B, Si, Ge, As, Sb, Te, or At, or a non-metal element of Groups 14 to 16 such as C, P, S, or Se. The transition metal element may include a lanthanum element or an actinium element. In one preferred embodiment, X may include at least one selected from the group consisting of Zr, Ti, W, B, P, Al, Si, Mg, Zn, and V.

The present invention also provides a lithium secondary battery including the electrode active material. The configuration and production method of the lithium secondary battery are known in the art, and thus a detailed description thereof will be omitted herein.

Effects of the Invention

As described above, the cathode active material for a lithium secondary battery according to the present invention has a low degree of aggregation between primary particles, thereby reducing resistance and improving the lifespan characteristics of a lithium secondary battery to which it is applied.

DESCRIPTION OF THE DRAWINGS

FIG. 1 is a graph showing the particle size distribution of cathode active materials according to Comparative Examples 1, 2, and 3 and Examples 1, 2, and 3;

FIG. 2A is an SEM image showing a cathode active material according to Example 1, FIG. 2B is an SEM image showing the cathode active material according to Example 2, FIG. 2C is an SEM image showing the cathode active material according to Example 3, FIG. 2D is an SEM image showing the cathode active material according to Comparative Example 1, FIG. 2E is an SEM image showing the cathode active material according to Comparative Example 2, and FIG. 2F is an SEM image showing the cathode active material according to Comparative Example 3;

FIG. 3 is a charge/discharge cycling graph of cathode active materials according to Comparative Examples 1, 2 and 3 and Examples 1, 2 and 3; and FIG. 4 is a graph illustrating changes in DCIR (resistance) during charge/discharge cycling of cathode active materials according to Comparative Examples 1, 2, and 3 and Examples 1, 2 and 3.

BEST MODE

Now, the present invention will be described in more detail with reference to the following examples. These examples should not be construed as limiting the scope of the present invention.

Example 1

$NiSO_4$ as a nickel precursor, $CoSO_4$ as a cobalt precursor, and $MnSO_4$ as a manganese precursor were added to water at a molar ratio of 0.83:0.11:0.06 to prepare an aqueous solution of a nickel-cobalt-manganese hydroxide precursor. An aqueous solution of sodium hydroxide was slowly added dropwise while the aqueous solution was stirred for 5 hours to neutralize the aqueous precursor solution to thereby precipitate $Ni_{0.83}Co_{0.11}Mn_{0.06}(OH)_2$ as nickel-cobalt-manganese hydroxide.

The precursor (nickel-cobalt-manganese hydroxide) thus obtained was mixed with LiOH, followed by heat treatment at 870° C. for 11 hours to prepare $LiNi_{0.83}Co_{0.11}Mn_{0.06}O_2$.

Subsequently, the prepared $LiNi_{0.83}Co_{0.11}Mn_{0.06}O_2$ was subjected to post-treatment by applying a pressure of about 3 MPa using an AutoPellet 3887.NE.L from Carver to produce a cathode active material for a lithium secondary battery.

Example 2

A cathode active material for a lithium secondary battery was produced under the same conditions as in Example 1, except that post-treatment was performed by applying shear force using ZM200 from Retsch (at 12,000 RPM, 0.4 millimeter mesh).

Example 3

A cathode active material for a lithium secondary battery was produced under the same conditions as in Example 1, except that post-treatment was performed by applying a pressure of about 2 MPa.

Comparative Example 1

A cathode active material for a lithium secondary battery was produced under the same conditions as in Example 1, except that post-treatment was not performed.

Comparative Example 2

A cathode active material for a lithium secondary battery was produced under the same conditions as in Comparative Example 1, except that heat treatment was performed at 850° C.

Comparative Example 3

A cathode active material for a lithium secondary battery was produced under the same conditions as in Example 1, except that post-treatment was performed by applying a pressure of about 1 MPa.

Experimental Example 1

The PSDs of the cathode active materials for lithium secondary batteries produced in Examples 1, 2, and 3, and Comparative Examples 1, 2, and 3 were measured, and the particle size distribution graph obtained from the measurement of PSD and the results of particle size distribution are shown in FIG. 1 and Table 1.

TABLE 1

| Composition of transition metal | Calcination temperature (° C.) | Post-treatment process | PSD | | | | (D90 − D10)/ D50 | FWHM | Maximum height of main peak (h) | FWHM/h |
|---|---|---|---|---|---|---|---|---|---|---|
| | | | D10 | D50 | D90 | R/L | | | | |
| Example 1 | $Ni_{0.83}Co_{0.10}Mn_{0.07}$ | 870 | Pressure (3 MPa) | 2.2 | 3.6 | 6.2 | 0.8 | 1.11 | 3.6 | 8.49 | 0.4 |
| Example 2 | $Ni_{0.83}Co_{0.10}Mn_{0.07}$ | 870 | Shear force | 2.6 | 4.4 | 7.3 | 0.8 | 1.07 | 4.6 | 8.51 | 0.5 |

TABLE 1-continued

| | Composition of transition metal | Calcination temperature (° C.) | Post-treatment process | PSD D10 | D50 | D90 | R/L | (D90 – D10)/ D50 | FWHM | Maximum height of main peak (h) | FWHM/h |
|---|---|---|---|---|---|---|---|---|---|---|---|
| Example 3 | $Ni_{0.83}Co_{0.10}Mn_{0.07}$ | 870 | Pressure (2 MPa) | 2.3 | 4.8 | 8.0 | 0.9 | 1.19 | 4.6 | 6.54 | 0.7 |
| Comparative Example 1 | $Ni_{0.83}Co_{0.10}Mn_{0.07}$ | 870 | X | 3.1 | 8.3 | 29.5 | 1.5 | 3.18 | 22.3 | 3.93 | 5.7 |
| Comparative Example 2 | $Ni_{0.83}Co_{0.10}Mn_{0.07}$ | 850 | X | 3.1 | 7.3 | 18.8 | 1.1 | 2.15 | 15.5 | 4.76 | 3.3 |
| Comparative Example 3 | $Ni_{0.83}Co_{0.10}Mn_{0.07}$ | 870 | Pressure (1 Mpa) | 3.2 | 7.2 | 14.5 | 0.7 | 1.57 | 10.4 | 6.20 | 1.7 |

As can be seen from FIG. 1, the distribution of Examples 1, 2 and 3 is narrower and more uniform than the PSD distributions of Comparative Examples 1, 2 and 3, which can be confirmed based on the observation that both the ratios (FWHM/h) of the full width at half maximum (FWHM) to the maximum height (h) of the main peak and the values of (D90–D10)/D50, indicating a particle size distribution, are lower for Examples than for Comparative Examples.

In addition, it can be seen that the ratios (R/L) of the right area (R) to the left area (L) in the graph based on the maximum point of the main peak in the particle size distribution graph of Examples 1, 2, and 3 are smaller than those of Comparative Examples 1 and 2.

Here, it can be seen that Comparative Example 3 has a lower R/L value of 0.7, but a higher ratio (FWHM/h) of the full width at half maximum (FWHM) to the maximum height (h) of the main peak of 1.7, and a higher value of (D90–D10)/D50, indicating a particle size distribution, of 1.57, compared to Examples.

It is considered that the active material of Comparative Example 3 was prepared through post-treatment by applying a pressure of 1 MPa during the production process, but proper post-treatment was not performed due to the application of a relatively weak pressure, so the particle size was not uniformly distributed.

That is, the active materials of Comparative Examples 1 and 2 were prepared without a separate post-treatment process, so the goals of uniform particle size distribution and reduced aggregation between primary particles were not accomplished. The active material of Comparative Example 3 was prepared by post-treatment at a relatively weak pressure (1 MPa), so aggregation between primary particles was reduced to some extent, but a uniform particle size distribution was not achieved.

On the other hand, the active materials of Examples 1, 2, and 3 exhibited a uniform particle size distribution and reduced aggregation between primary particles through appropriate post-treatment (application of 3 MPa pressure, application of shear force, and application of 2 MPa pressure) during the production process.

Experimental Example 2

The cathode active materials for lithium secondary batteries prepared in Examples 1, 2 and 3, and Comparative Examples 1, 2 and 3, were observed through a scanning electron microscope, and the results are shown in FIG. 2.

Referring to FIG. 2, a number of aggregates are observed in the Comparative Examples shown in (d), (e), and (f). In contrast, although small amounts of aggregates were observed in the Examples shown in (a), (b) and (c), the proportion of aggregates was remarkably reduced compared to Comparative Examples.

Experimental Example 3

The cathode active material prepared in each of Examples 1, 2, and 3 and Comparative Examples 1, 2, and 3, a conductive agent, and a binder were mixed at a ratio of 92:5:3 (active material:conductive agent:binder) and applied to a copper current collector, followed by drying to produce a cathode. A secondary battery was fabricated using lithium metal as an anode and adding EC:EMC=1:2 and $LiPF_6$ 1 M as an electrolyte, the electrochemical properties thereof were measured, and the results are shown in Tables 2 and 3 and FIGS. 3 and 4.

TABLE 2

| | 0.1/0.1 FM | | | Lifespan |
|---|---|---|---|---|
| | Charge | Discharge | Efficiency | $50^{th}/1^{st}$ |
| | mAh/g | | % | % |
| Example 1 | 226.4 | 195.6 | 86.4 | 93.4 |
| Example 2 | 226.7 | 195.5 | 86.2 | 93.6 |
| Example 3 | 226.3 | 195.1 | 86.2 | 93.0 |
| Comparative Example 1 | 223.4 | 192.5 | 86.2 | 86.2 |
| Comparative Example 2 | 224.2 | 190.5 | 85.0 | 90.2 |
| Comparative Example 3 | 225.1 | 193.8 | 86.1 | 90.5 |

TABLE 3

| | DCIR [%] | | | | |
|---|---|---|---|---|---|
| | $\Delta\ 10^{th}\text{-}1^{st}$ | $\Delta\ 20^{th}\text{-}1^{st}$ | $\Delta\ 30^{th}\text{-}1^{st}$ | $\Delta\ 40^{th}\text{-}1^{st}$ | $\Delta 50^{th}\text{-}1^{st}$ |
| Example 1 | 4.7 | 8.7 | 16.2 | 24.8 | 33.2 |
| Example 2 | 6.3 | 9.9 | 20.2 | 27.2 | 34.2 |
| Example 3 | 6.4 | 9.0 | 19.2 | 28.2 | 38.5 |
| Comparative Example 1 | 8.0 | 15.1 | 25.1 | 35.4 | 45.9 |
| Comparative Example 2 | 8.6 | 15.2 | 22.8 | 31.9 | 43.4 |
| Comparative Example 3 | 8.9 | 15.6 | 22.2 | 31.1 | 43.3 |

First, as can be seen from Table 2 and FIG. 3, compared to Comparative Examples, the active materials of Examples 1, 2 and 3, in which both reduced aggregation between primary particles and a uniform particle size distribution are achieved, exhibit relatively high charging capacity and excellent lifespan characteristics.

In addition, Tables 3 and 4 show a change in DCIR (resistance) during cycling of the secondary batteries to which the active materials of Examples 1, 2, and 3 and Comparative Examples 1, 2 and 3 are applied. It can be seen therefrom that, compared to Comparative Examples, the batteries to which the active materials of Examples are applied exhibited relatively low resistance, based on which it can be expected that battery characteristics such as lifespan characteristics are improved.

Although preferred embodiments of the present invention have been disclosed for illustrative purposes, those skilled in the art will appreciate that various modifications, additions, and substitutions are possible without departing from the scope and spirit of the invention as disclosed in the accompanying claims.

The invention claimed is:

1. A cathode active material for lithium secondary batteries comprising lithium transition metal composite oxide in the form of primary particles having a one-body structure, the cathode active material having a ratio (R/L) of a right area (R) to a left area (L) in a particle size distribution (PSD) graph of greater than or equal to 0.8 and less than or equal to 0.9, based on a maximum point of a main peak in the particle size distribution (PSD) graph, in which an X-axis represents a particle size (μm) and a Y-axis represents a relative particle amount (%), wherein the cathode active material comprises lithium nickel-cobalt-manganese oxide, and the cathode active material has a particle size distribution, represented by (D90-D10)/D50, of greater than or equal to 1.07 and less than or equal to 1.19.

2. The cathode active material according to claim 1, wherein the cathode active material has a ratio (FWHM/maximum height) of a full width at half maximum (FWHM) to a maximum height of the main peak in the particle size distribution (PSD) graph of 1.0 or less.

3. The cathode active material according to claim 1, wherein the primary particles have an average particle diameter of 3 to 10 μm.

4. A lithium secondary battery comprising the cathode active material according to claim 1.

* * * * *